United States Patent [19]
Meyer

[11] Patent Number: 5,988,044
[45] Date of Patent: Nov. 23, 1999

[54] PISTON HAVING INSULATED CAP

[75] Inventor: Leon G. Meyer, Alden, N.Y.

[73] Assignee: Occidental Chemical Corporation, Dallas, Tex.

[21] Appl. No.: 09/036,638

[22] Filed: Mar. 6, 1998

[51] Int. Cl.⁶ ....................... F01B 31/00
[52] U.S. Cl. ............... 92/176; 92/172; 92/248; 188/264 G
[58] Field of Search ............ 92/248, 176, 172; 188/264 G, 72.4

[56] References Cited

U.S. PATENT DOCUMENTS

| | | |
|---|---|---|
| 4,248,329 | 2/1981 | Torigoe ............... 188/264 G |
| 4,449,447 | 5/1984 | Yanagi ....................... 92/248 |
| 4,513,844 | 4/1985 | Hoffman, Jr. ............ 188/264 G |
| 4,572,334 | 2/1986 | Villata . |
| 4,649,806 | 3/1987 | Hartsock . |
| 5,031,511 | 7/1991 | Villata . |
| 5,127,494 | 7/1992 | Mery . |
| 5,575,358 | 11/1996 | McCormick ............ 188/264 G |
| 5,713,435 | 2/1998 | Schneider et al. ......... 188/264 G |

*Primary Examiner*—Thomas E. Denion
*Attorney, Agent, or Firm*—Anne E. Brookes; Richard D. Fuerle

[57] ABSTRACT

Disclosed is a piston having a cylindrical body made from a thermosetting molding compound. The body has a central well and a molded-on metal cap having sides that extend downward over the exterior of the body and into the well. There is insulation under and in contact with the metal cap.

20 Claims, 3 Drawing Sheets

PISTON HAVING INSULATED CAP

BACKGROUND OF THE INVENTION

This invention relates to a metal capped piston having insulation under the cap. In particular, it relates to a brake piston made from a thermosetting molding compound that has a molded-on metal cap under which is insulation.

Brake pistons are commonly made by molding phenol formaldehyde molding compound into the shape of the piston, then grinding the rough piston to the precise piston dimensions. Metal caps are often molded onto the top of the piston to prevent degradation of the phenolic from the heat generated in braking. While a metal cap will extend the life of a piston, the phenolic material under the metal cap will eventually degrade, resulting in the failure of the piston.

SUMMARY OF THE INVENTION

I have discovered that heat degradation of metal capped pistons made out of thermosetting molding compounds can be greatly reduced or even eliminated if there is insulation under and in contact with the metal cap. This can be easily accomplished in the molding process with little or no additional cost. Brake pistons made according to this invention can withstand heat that degrades identical pistons that do not have such insulation under the metal cap.

DESCRIPTION OF THE PREFERRED EMBODIMENTS

Figure 1:
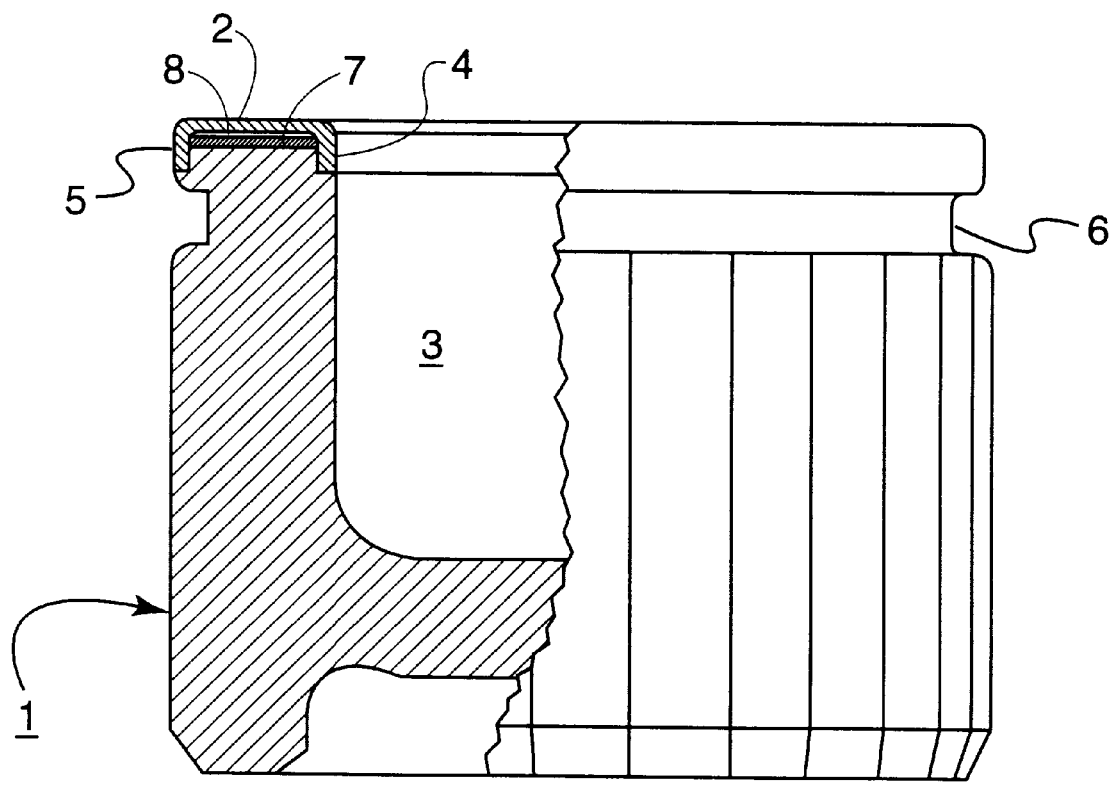
FIGS. 1, 2, and 3 are side views partially in section showing various embodiments of brake pistons according to this invention.

FIG. 1 shows a side view partially in section of a molded brake piston 1 having a molded-on metal cap 2. The piston 1 has a cylindrical interior well 3 for the purposes of saving material and making the piston lighter. Metal cap 2 has an interior flange 4 that extends into well 3 and an exterior flange 5 that extends over the outside of piston 1. Also shown is an annular dust boot 6 for the purpose of keeping road dust out of the brake. Under metal cap 2 is molded a washer-shaped metal spacer 7. There is an insulating air gap 8 of about 0.0001 to about 0.003 inches (about 0.0024 to about 0.076 mm) in between metal cap 2 and metal spacer 7 which acts as insulation.

Figure 2:
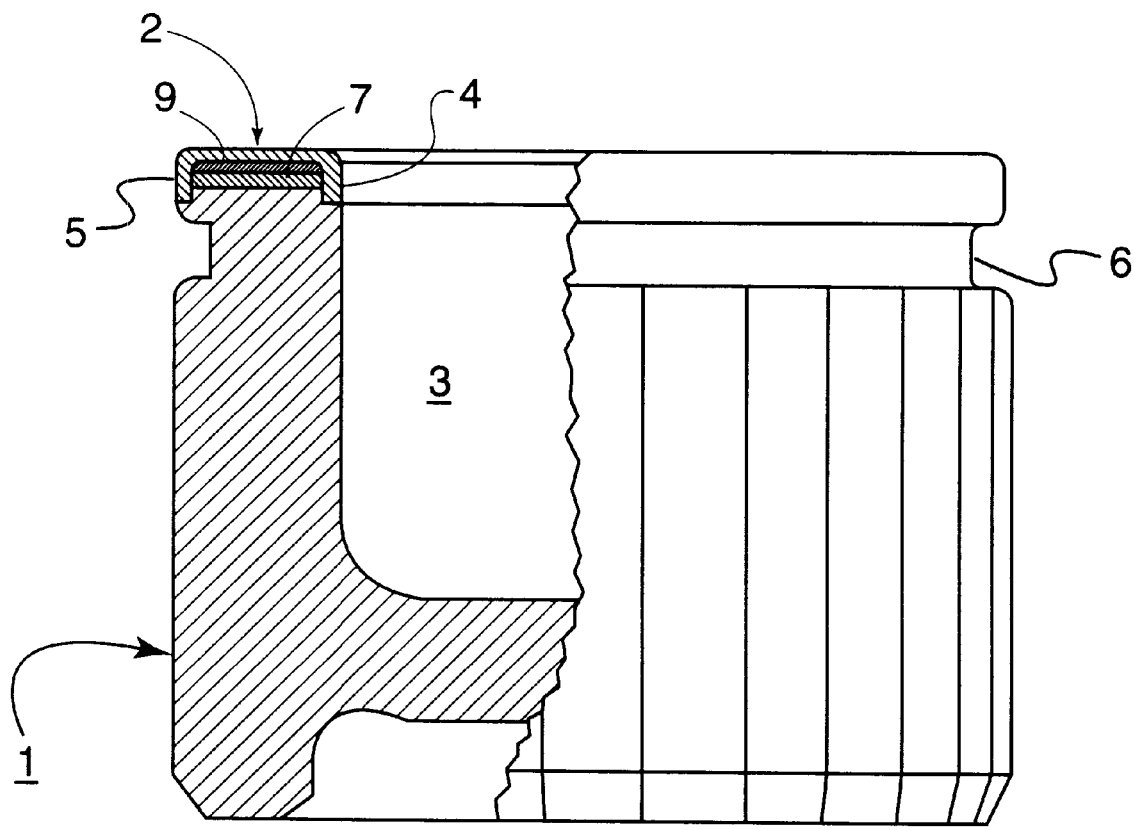

FIG. 2 is identical to FIG. 1 except that air gap 8 has been replaced by about 0.005 to about 0.02 inches (about 0.13 to about 0.5 mm) of insulating material 9, which may consist of materials such as fiberglass, silicone, or carbonized organic resin.

Figure 3:
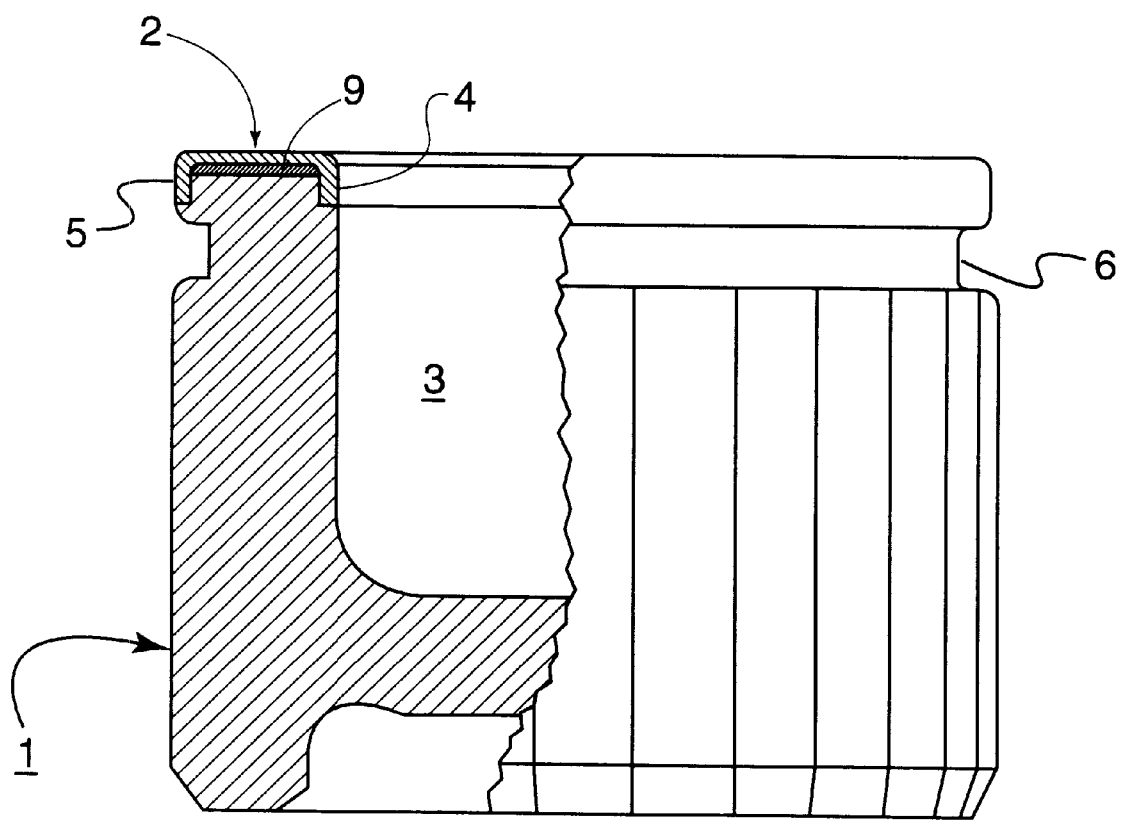

FIG. 3 is identical to FIG. 1 except that metal spacer 7 and air gap 8 have been replaced with insulating material 9.

This invention applies to any type of piston, including brake pistons, hydraulic pistons, and pneumatic pistons, but it is particularly applicable to brake pistons. The pistons are made out of a thermosetting molding compound, such as melamine formaldehyde or phenol formaldehyde. Most commonly, phenol formaldehyde is used for brake pistons, but the invention is applicable to any molded compound that will degrade when heated.

The invention applies to pistons that have metal caps on the open or hot side of the piston. These metal caps are generally molded-on as molded-on caps are more effective than snap-on caps. The caps are annular and extend downward over both sides the body of the piston. The pistons are almost always cylindrical and are usually made with a well to reduce cost and weight. The cap can be constructed of various metals, such as steel, stainless steel, copper, brass, and aluminum.

The piston can be made by placing the cap, insulation, and spacer (if one is used) in a mold. If compression molding is used to make the piston, a preformed molding compound is placed in the mold prior to compression molding. If injection molding is used, the molding compound is forced into the mold. For phenolic molding compounds, a typical practice is to heat for about 2 minutes at 340 to 350° F., place the rough piston into an oven, age it for up to 16 hours at 400 to 450° F., and then grind it to the final dimensions. Typical brake pistons are about 1⅞ to about 3 inches in diameter.

I claim:

1. A piston comprising
   (A) a cylindrical body made from a thermoset molding compound having a central well at one end;
   (B) an annular metal cap having a first side that extends downward over the outside of said cylindrical body and a second side that extends into said central well, where both sides are molded onto said cylindrical body; and
   (C) insulation under and in contact with said metal cap.
2. A piston according to claim 1 wherein said thermoset molding compound is a phenolic molding compound.
3. A piston according to claim 1 wherein said metal cap is made of steel.
4. A piston according to claim 1 wherein said insulation is air.
5. A piston according to claim 4 wherein said air is about 0.001 to about 0.003 inches thick.
6. A piston according to claim 4 wherein a washer-shaped spacer is molded to the end of said cylindrical body and said air insulation is between said spacer and said metal cap.
7. A piston according to claim 1 wherein said insulation is silicone.
8. A piston according to claim 1 wherein said piston has an external annular dust boot.
9. A brake piston comprising
   (A) a cylindrical body made from a phenolic molding compound having a central well at one end;
   (B) an annular metal cap having a first side that extends downward over the outside of said body and a second side that extends into said well, where both sides are molded onto said cylindrical body; and
   (C) insulation between said metal cap and the end of said cylindrical body.
10. A piston according to claim 9 wherein said metal cap is made of steel.
11. A piston according to claim 9 wherein said insulation is air.
12. A piston according to claim 11 wherein said air is about 0.0001 to about 0.003 inches thick.
13. A piston according to claim 12 wherein a washer-shaped spacer is molded to the end of said cylindrical body and said air insulation is between said spacer and said metal cap.
14. A piston according to claim 9 wherein said insulation is silicone.
15. A piston according to claim 9 wherein said piston has an external annular dust boot.
16. A brake piston comprising
   (A) a cylindrical body made from a phenol-formaldehyde molding compound having a central well at one end;

(B) an annular metal cap having a first side that extends downward over the outside of said body and a second side that extends into said well, where both sides are molded onto said cylindrical body; and (C) insulation in between said steel cap and the end of said cylindrical body.

17. A piston according to claim 16 wherein said insulation is air.

18. A piston according to claim 17 wherein said air is about 0.001 to about 0.003 inches thick.

19. A piston according to claim 16 wherein said insulation is silicone.

20. A piston according to claim 16 wherein said piston has an external annular dust boot.

* * * * *